(12) United States Patent
Singh et al.

(10) Patent No.: US 12,556,397 B2
(45) Date of Patent: Feb. 17, 2026

(54) SYSTEM FOR DIGITAL IDENTITY DETECTION AND VERIFICATION WHEN TRAVERSING BETWEEN VIRTUAL ENVIRONMENTS

(71) Applicant: BANK OF AMERICA CORPORATION, Charlotte, NC (US)

(72) Inventors: Shailendra Singh, Maharashtra (IN); Sandeep Kumar Chauhan, Miyapur Hyderabad (IN); Puneetha Polasa, Telangana (IN); Bhagya Lakshmi Sudha Lavanya Mallidi, Hyderabad (IN); Saurabh Arora, Gurugram (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 207 days.

(21) Appl. No.: 17/871,020

(22) Filed: Jul. 22, 2022

(65) Prior Publication Data

US 2024/0031162 A1 Jan. 25, 2024

(51) Int. Cl.
*H04L 9/32* (2006.01)
*H04L 9/00* (2022.01)

(52) U.S. Cl.
CPC .......... *H04L 9/3236* (2013.01); *H04L 9/3213* (2013.01); *H04L 9/50* (2022.05)

(58) Field of Classification Search
CPC ....... H04L 9/3236; H04L 9/50; H04L 9/3213; G06T 19/006; G06T 13/40; G06T 19/00; A63F 13/00; A63F 2300/00
See application file for complete search history.

(56) References Cited

U.S. PATENT DOCUMENTS

| 10,326,667 | B2 | 6/2019 | Jones |
| 11,494,760 | B1 | 11/2022 | Khan |
| 11,860,981 | B2 | 1/2024 | Yallen |
| 2002/0188678 | A1* | 12/2002 | Edecker ................ H04L 67/131 709/204 |

(Continued)

FOREIGN PATENT DOCUMENTS

| KR | 20190127512 | * 11/2019 |
| WO | 2022214690 A1 | 10/2022 |

(Continued)

*Primary Examiner* — Hadi S Armouche
(74) *Attorney, Agent, or Firm* — Moore & Van Allen PLLC; Anup Iyer

(57) ABSTRACT

Systems, computer program products, and methods are described herein for digital identity detection and verification when traversing between virtual environments. The present invention is configured to receive, from a user input device, a request from a user to traverse from a first virtual environment to a second virtual environment using an NFT identifier; retrieve, using an NFT navigation engine, an NFT from a distributed ledger based on at least the NFT identifier; extract, from a metadata layer of the NFT, information associated with the user and transaction conditions associated with traversing from the first virtual environment to the second virtual environment; and authorize, using an access management engine, the user to traverse from the first virtual environment to the second virtual environment based on at least the information associated with the user and the transaction conditions.

15 Claims, 6 Drawing Sheets

(56) References Cited

U.S. PATENT DOCUMENTS

| | | | | |
|---|---|---|---|---|
| 2008/0263460 A1* | 10/2008 | Altberg | G06Q 30/02 | 715/757 |
| 2009/0235191 A1* | 9/2009 | Garbow | G06F 3/04815 | 715/764 |
| 2010/0229235 A1* | 9/2010 | Dawson | H04L 9/3265 | 713/171 |
| 2011/0010675 A1* | 1/2011 | Hamilton, II | A63F 13/335 | 715/850 |
| 2011/0055135 A1* | 3/2011 | Dawson | G06Q 30/02 | 709/204 |
| 2012/0295700 A1* | 11/2012 | Reiche | A63F 13/79 | 463/31 |
| 2013/0111359 A1* | 5/2013 | Silbey | G06Q 50/01 | 715/753 |
| 2018/0059902 A1* | 3/2018 | Martin | G06V 20/20 | |
| 2018/0159841 A1* | 6/2018 | Toff | H04L 63/08 | |
| 2021/0256070 A1 | 8/2021 | Tran | | |
| 2023/0070586 A1* | 3/2023 | Kapur | G06Q 20/123 | |
| 2023/0137613 A1 | 5/2023 | Lai | | |
| 2023/0161824 A1* | 5/2023 | Pandit | G06T 19/003 | 707/769 |
| 2023/0222493 A1* | 7/2023 | Jain | G06Q 20/3678 | 705/69 |
| 2023/0316263 A1 | 10/2023 | Eby | | |
| 2023/0319144 A1 | 10/2023 | Smith | | |
| 2023/0334488 A1 | 10/2023 | Reineke | | |
| 2023/0379179 A1* | 11/2023 | Davis | H04L 9/3247 | |
| 2023/0394455 A1 | 12/2023 | Meyers | | |
| 2023/0409679 A1* | 12/2023 | Rubin | H04L 9/3073 | |
| 2023/0419192 A1 | 12/2023 | Kandel | | |
| 2024/0005608 A1 | 1/2024 | Inch | | |
| 2024/0135437 A1 | 4/2024 | Yang | | |

FOREIGN PATENT DOCUMENTS

| | | |
|---|---|---|
| WO | WO-2023283659 A2 * | 1/2023 |
| WO | WO-2023017580 A1 * | 2/2023 |
| WO | 2023034527 A1 | 3/2023 |
| WO | 2023131626 A1 | 7/2023 |
| WO | 2023154203 A1 | 8/2023 |
| WO | 2023219208 A1 | 11/2023 |
| WO | 2024071941 A1 | 4/2024 |
| WO | 2024085684 A1 | 4/2024 |

* cited by examiner

SYSTEM FOR DIGITAL IDENTITY DETECTION AND VERIFICATION WHEN TRAVERSING BETWEEN VIRTUAL ENVIRONMENTS

FIELD OF THE INVENTION

The present invention embraces a system for digital identity detection and verification across virtual environments.

BACKGROUND

Virtual environments present a unique challenge of open interoperability, where digital identities can move across therebetween. There is a need for a system for digital identity detection and verification allowing the user to establish a digital identity when accessing a virtual environment and monitoring the digital identity when traversing between virtual environments.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for digital identity detection and verification when traversing between virtual environments is presented. The system comprising: at least one non-transitory storage device; and at least one processor coupled to the at least one non-transitory storage device, wherein the at least one processor is configured to: receive, from a user input device, a request from a user to traverse from a first virtual environment to a second virtual environment using an NFT identifier; retrieve, using an NFT navigation engine, an NFT from a distributed ledger based on at least the NFT identifier; extract, from a metadata layer of the NFT, information associated with the user and transaction conditions associated with traversing from the first virtual environment to the second virtual environment; and authorize, using an access management engine, the user to traverse from the first virtual environment to the second virtual environment based on at least the information associated with the user and the transaction conditions.

In some embodiments, the at least one processor is further configured to: determine that the request to traverse from the first virtual environment to the second virtual environment comprises a request to access the second virtual environment; extract, from the metadata layer of the NFT, transaction conditions associated with user access to the second virtual environment; and authorize, using the access management engine, the user to access the second virtual environment based on at least the transaction conditions associated with user access to the second virtual environment.

In some embodiments, the at least one processor is further configured to: validate, using the access management engine, the information associated with the user to verify user identity; determine, using the access management engine, that the transaction conditions meet one or more requirements for access to the second virtual environment, wherein the transaction conditions comprise at least access privileges of the user; and authorize, using the access management engine, the user to access the second virtual environment based on at least validating the information associated with the user and that the transaction conditions meet the one or more requirements for access to the second virtual environment.

In some embodiments, the at least one processor is further configured to: receive, from the user input device, a request from the user to access the first virtual environment, wherein the request comprises at least the NFT identifier; extract, from the metadata layer of the NFT, information associated with the user and transaction conditions associated with the access to the first virtual environment; and authorize, using the access management engine, the user to access the first virtual environment based on at least the information associated with the user and the transaction conditions associated with the access to the first virtual environment.

In some embodiments, the at least one processor is further configured to: receive, from the user input device, an access registration request from the user; prompt the user, via the user input device, to provide at least the information associated with the user, information associated with a digital identity of the user; receive, from the user input device, the information associated with the user and the information associated with a digital identity of the user; and authorize the access registration request based on at least the information associated with the user and the information associated with a digital identity of the user.

In some embodiments, the digital identity of the user comprises at least an avatar.

In some embodiments, the information associated with a digital identity of the user further comprises one or more avatar attributes, wherein the one or more avatar attributes comprises rotational angles of the avatar, scale of the avatar in a virtual environment spatial space, dimensions of the avatar, mass of the avatar, friction property of the avatar, pixel density of the avatar, color of the avatar, shading of the avatar, texture of the avatar, lighting of the avatar, behavior of the avatar, and input device impact on the avatar.

In some embodiments, authorizing the access registration request further comprises: generating, using an NFT generation engine, the NFT based on at least the information associated with the user and the information associated with the digital identity of the user; and linking the user identity with the NFT.

In some embodiments, the at least one processor is further configured to: determine an authorization level associated with the user based on at least the information associated with the user; generate transaction conditions associated with traversing from the first virtual environment to the second virtual environment for the user based on at least the authorization level associated with the user; record the transaction conditions associated with traversing from the first virtual environment to the second virtual environment for the user in a smart contract associated with the NFT; and store the smart contract in the metadata layer of the NFT.

In some embodiments, the at least one processor is further configured to: determine that the user has traversed from the first virtual environment to the second virtual environment; and continuously monitor the digital identity of the user in the first virtual environment and the second virtual environment.

In some embodiments, the at least one processor is further configured to: determine simultaneous instances of access of the user in both the first virtual environment and the second virtual environment using the digital identity; extract one or more attributes of the digital identity of the user during the simultaneous instances of access; compare the one or more attributes of the digital identity of the user during the simultaneous instances of access with the information associated with the digital identity of the user recorded in the NFT; determine that the one or more attributes of the digital identity of the user during the simultaneous instances of access does not match the information associated with the digital identity of the user recorded in the NFT; and transmit control signals configured to cause an administrator input device to display a notification indicating that the one or more attributes of the digital identity of the user during the simultaneous instances of access does not match the information associated with the digital identity of the user recorded in the NFT.

In another aspect, a computer program product for digital identity detection and verification when traversing between virtual environments is presented. The computer program product comprising a non-transitory computer-readable medium comprising code causing an apparatus to: receive, from a user input device, a request from a user to traverse from a first virtual environment to a second virtual environment using an NFT identifier; retrieve, using an NFT navigation engine, an NFT from a distributed ledger based on at least the NFT identifier; extract, from a metadata layer of the NFT, information associated with the user and transaction conditions associated with traversing from the first virtual environment to the second virtual environment; and authorize, using an access management engine, the user to traverse from the first virtual environment to the second virtual environment based on at least the information associated with the user and the transaction conditions.

In yet another aspect, a method for digital identity detection and verification when traversing between virtual environments is presented. The method comprising: receiving, from a user input device, a request from a user to traverse from a first virtual environment to a second virtual environment using an NFT identifier; retrieving, using an NFT navigation engine, an NFT from a distributed ledger based on at least the NFT identifier; extracting, from a metadata layer of the NFT, information associated with the user and transaction conditions associated with traversing from the first virtual environment to the second virtual environment; and authorizing, using an access management engine, the user to traverse from the first virtual environment to the second virtual environment based on at least the information associated with the user and the transaction conditions.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
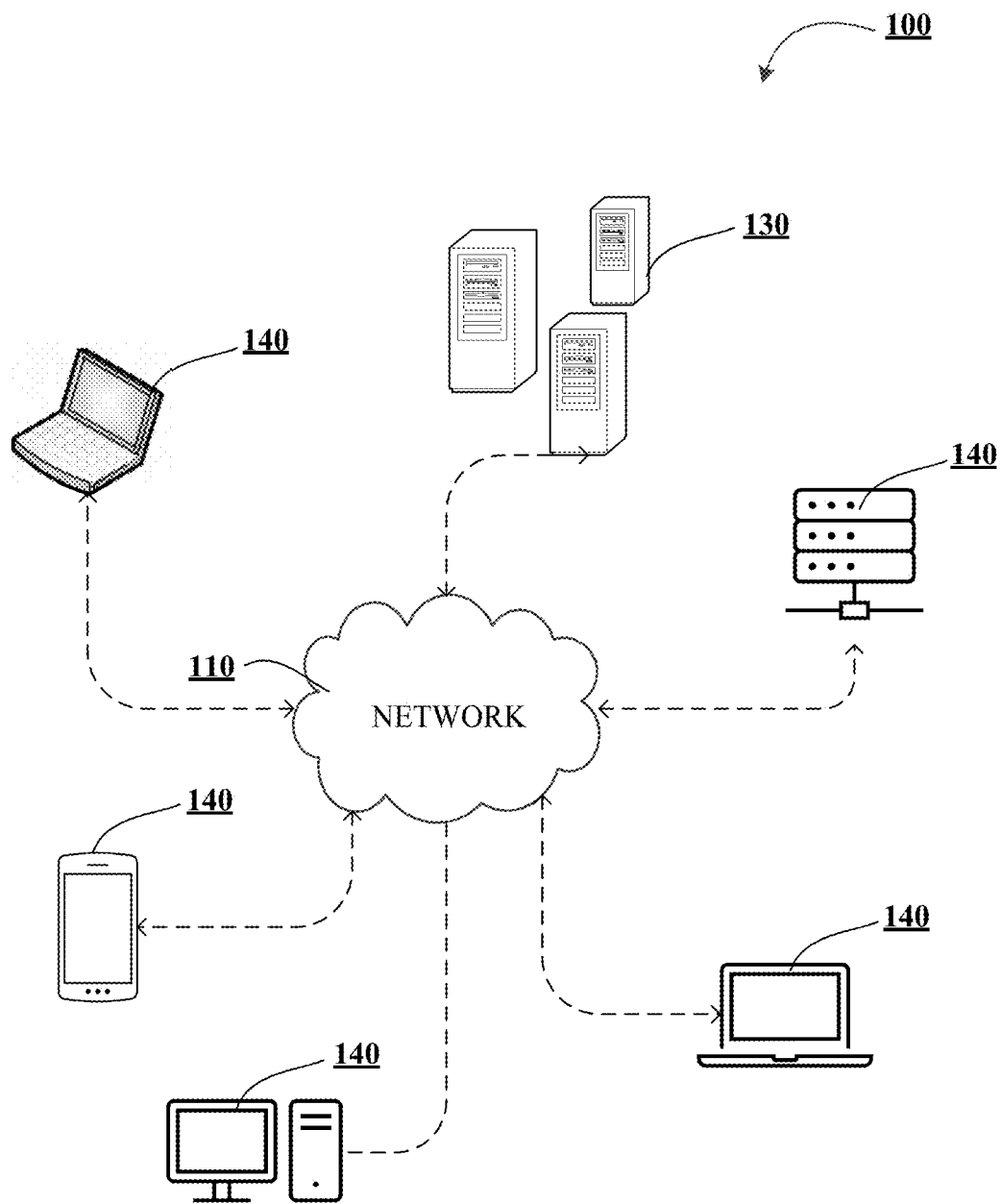
Figure 1B:
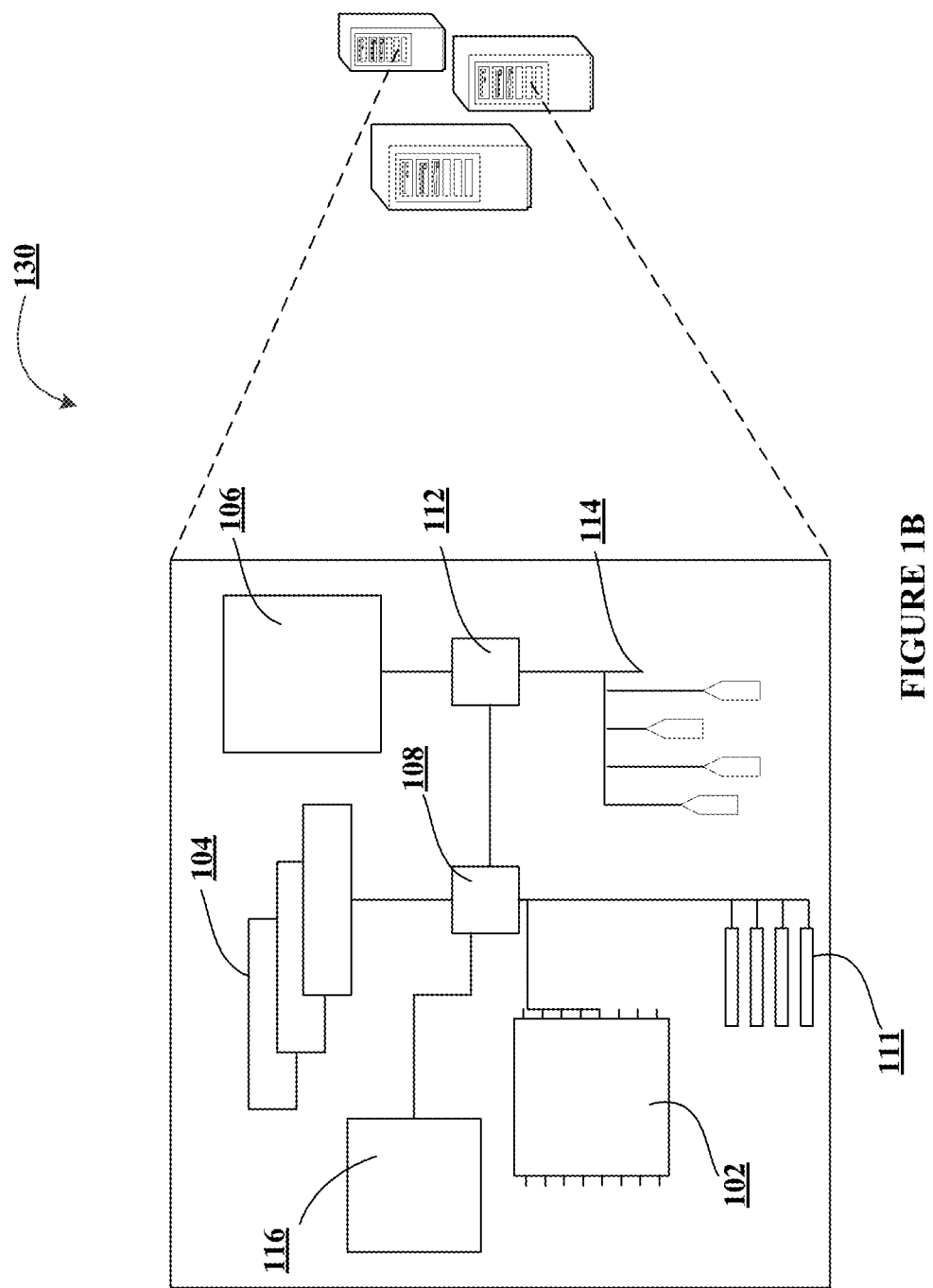
Figure 1C:
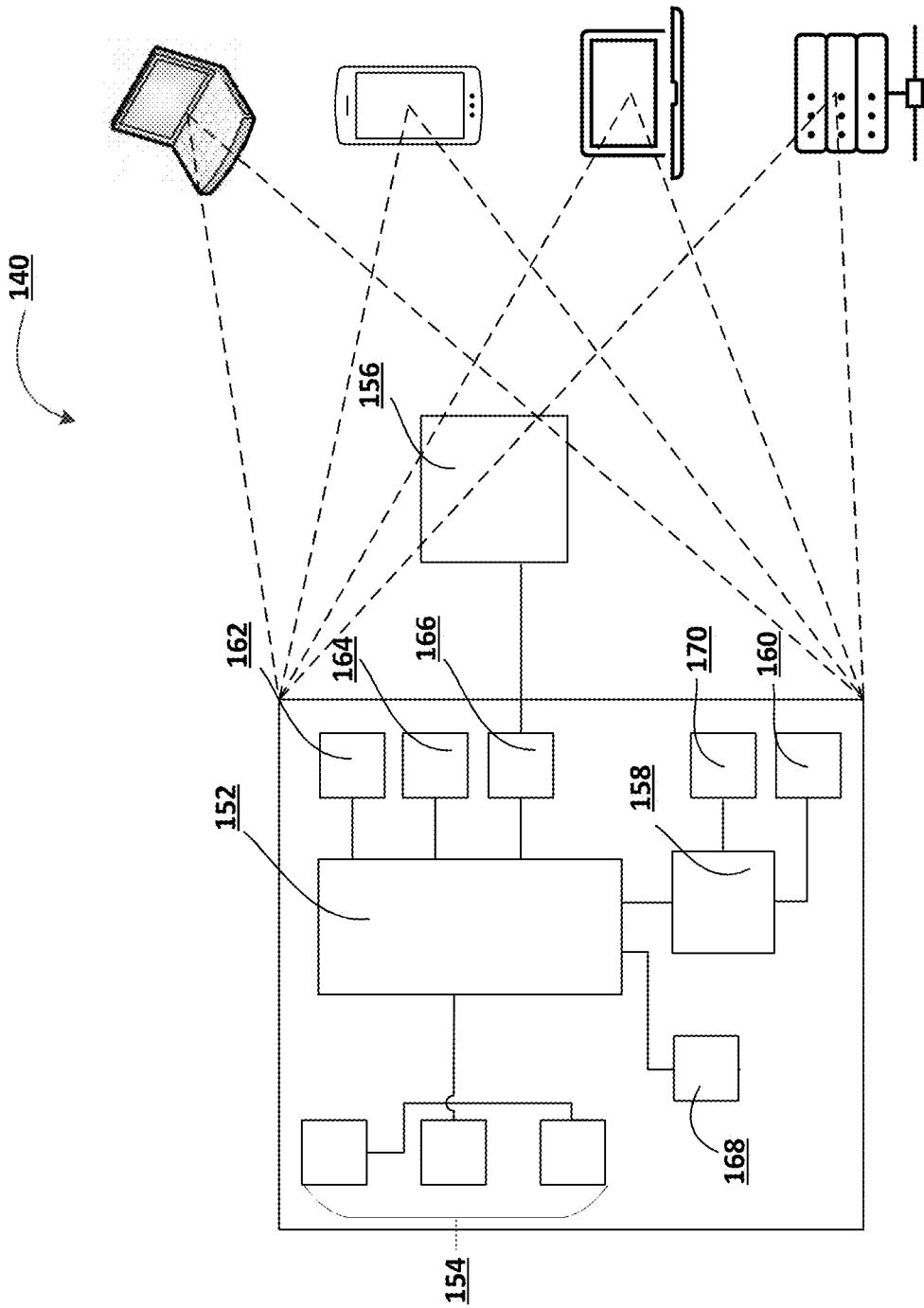
Figure 2A:
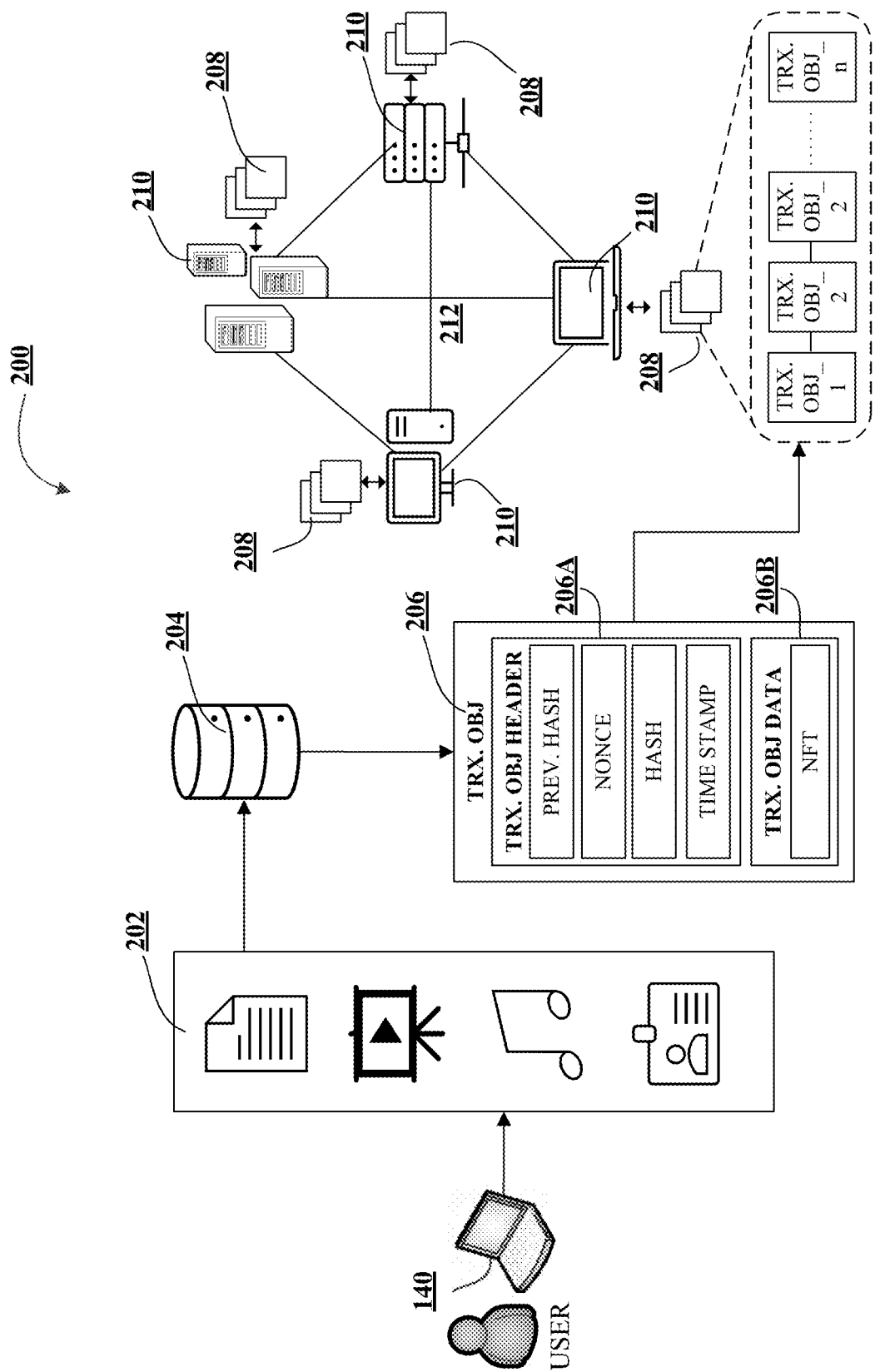
Figure 2B:
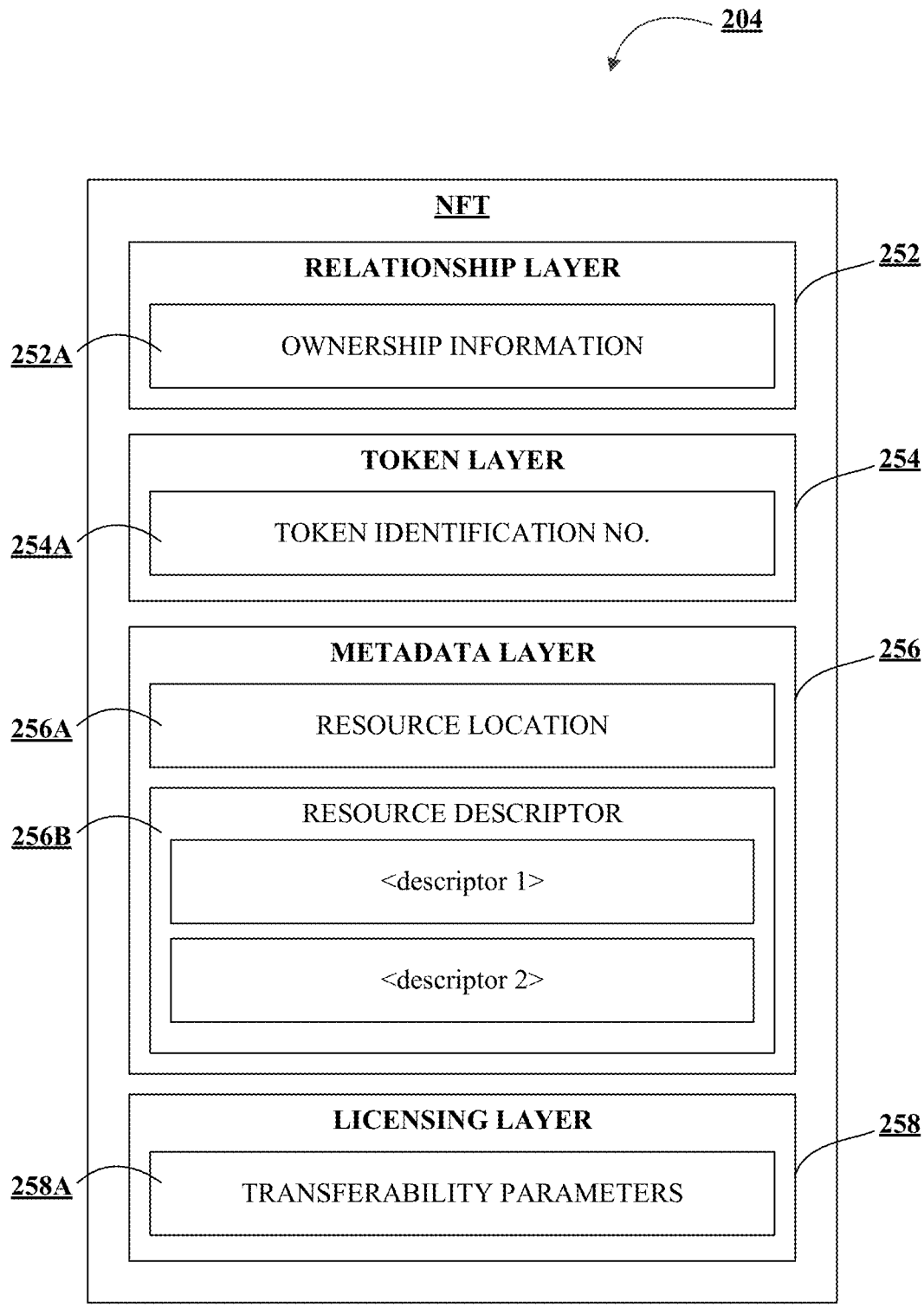
Figure 3:
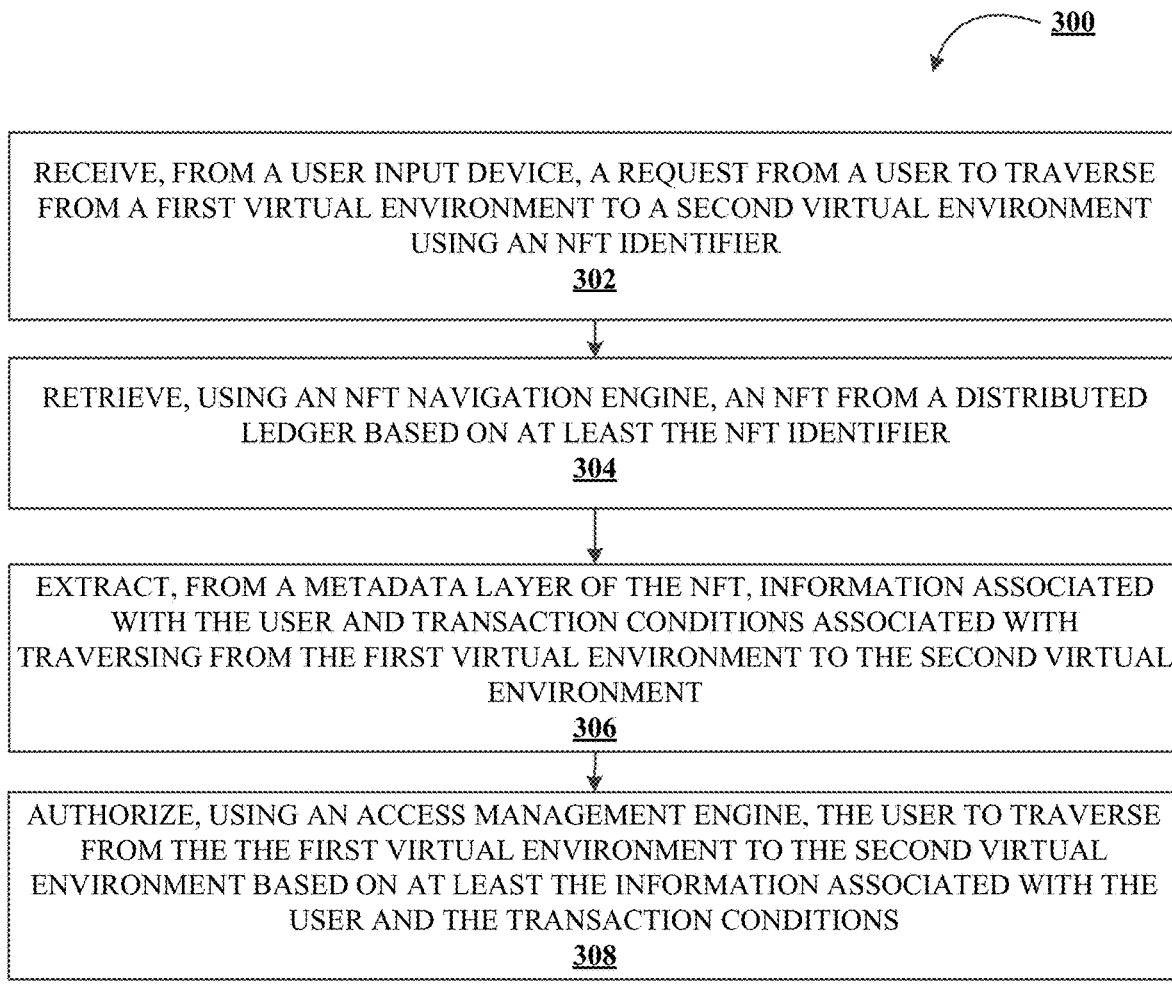

Having thus described embodiments of the invention in general terms, reference will now be made the accompanying drawings, wherein:

FIGS. 1A-1C illustrates technical components of an exemplary distributed computing environment system for digital identity detection and verification when traversing between virtual environments, in accordance with an embodiment of the invention;

FIG. 2A illustrates an exemplary process of creating an NFT, in accordance with an embodiment of the invention;

FIG. 2B illustrates an exemplary NFT as a multi-layered documentation of a resource, in accordance with an embodiment of an invention; and FIG. 3 illustrates a process flow system for digital identity detection and verification when traversing between virtual environments, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "virtual environments" may refer to a collection of persistent, shared, three-dimensional virtual spaces linked into a perceived virtual universe. In some embodiments, virtual environment may not only refer to virtual worlds, but the Internet as a whole, including the spectrum of augmented reality. Virtual environment may include a number of different elements such as video conferencing, digital currencies, virtual reality platforms, social media, live data streaming, digital representations of real-life objects and/or the like. In some embodiments, the virtual environment may include virtual properties, such as virtual land parcels and estates for users to create and build-on, or structures that reflect real-life properties and/or completely original creations. These spaces may be represented by co-ordinates on the metaverse platform where users can meet up using their avatars to socialize and decorate their own spaces with collectibles. Any combination of the aforementioned elements may form a computer-mediated virtual world, within the virtual environment. Within this self-sustaining, persistent, and shared realm, users may exist and interact with each other using their digital avatars.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Digital identity detection and verification explores an intelligent mechanism to establish a digital identity of the user using non-fungible tokens (NFT). To access virtual environments in the metaverse, users often establish a digital representative, i.e., an avatar. Each user's avatar may have a different form, which when combined with information that uniquely identifies the user, can be used as a digital identity. This digital identity is then recorded as an NFT (and may have an outward appearance as the avatar). The user may use this NFT as an identification element to access virtual environments. In addition to registering the digital identity, the user may request and subsequently be granted access privileges specific to a virtual environment, that are then stored in a metadata layer of the NFT. These access privileges establish the metes and bounds of actions that the user may execute when accessing each virtual environment. When the user wishes to access a virtual environment, the user may provide the NFT as a "key," requesting access, and can subsequently be granted permission to access the virtual environment. During each instance of access, the user's NFT, i.e., outward appearance as avatar, is continuously monitored to verify the identity of the user at all times, where the appearance of the avatar is compared against the various attributes that were registered and stored in the resource layer of the NFT. Each instance of access is also analyzed against the access privileges stored in the metadata layer (e.g., smart contract) of the NFT for authorization.

When accessing virtual environments, it is not uncommon for the user to traverse from one virtual environment to another in the same access session. For example, the user may execute a few transactions within a financial institution virtual environment, and then wish to travel to a virtual environment representing an educational institution, all within the same access session. The user may use the same digital identity (recorded as an NFT) to traverse between such virtual environments. Here, the NFT may not only include access privileges specific to each virtual environment, but also specific rules that dictate conditions when traversing from one virtual environment to another. These rules may also be stored in the metadata layer of the NFT, in addition to the access privileges. Therefore, each time the user traverses from one virtual environment to another, the traversal is analyzed against the rules stored in the metadata layer (e.g., smart contract) of the NFT for authorization. In addition, the virtual environments accessed by the user are monitored for NFT duplicates to ensure that the user is not in two places at once, a cause for potential exposure.

(1) Receives, from a user input device, a request from a user to traverse from a first virtual environment to a second virtual environment using an NFT identifier. To register the user, the present invention: (i) Receives, from the user input device, an access registration request from the user, (ii) Prompts the user to provide at least the information associated with the user and information associated with a digital identity of the user. Information associated with the user—personal identification information. Information associated with the digital identity—avatar attributes, (iii) Determines access privileges for the user—rights and abilities of the user when interacting with digital objects within a particular virtual environment and when traversing from one virtual environment to another, (iv) Generates an NFT. Records the information associated with the user and the information associated with the digital identity in the metadata layer of the NFT. Records the access privileges in a smart contract, and (v) Records the NFT in a distributed ledger. Generates an NFT identifier corresponding to the NFT, (2) Retrieves, using an NFT navigation engine, an NFT from a distributed ledger based on at least the NFT identifier, (3) Extracts, from a metadata layer of the NFT, information associated with the user and transaction conditions associated with traversing from the first virtual environment to the second virtual environment, (4) Authorizes, using an access management engine, the user to traverse from the first virtual environment to the second virtual environment and access the second virtual environment. Verifies the information associated with the user. Determines the metes and bounds of the access privileges dictated in the transaction conditions, (5) Monitors the digital identity of the user when the user traverses from one virtual environment to another in both the first virtual environment and the second virtual environment. If the user's digital identity is detected simultaneously in both the first virtual environment and the second virtual environment, it may be a cause for potential exposure. Extracts the appearance of the avatar in both the first virtual environment and the second virtual environment during the simultaneous instances of access. If simultaneous access is detected, it is likely that the appearance of at least one of the avatars will not match the various attributes registered and recorded in the NFT, revoke authorization. The avatar whose appearance does not match the attributes is identified and the incidence of simultaneous access is detected and escalated for administrative review, (6) Each instance of access is also analyzed against the transaction conditions (e.g., access privileges) stored in the metadata layer (e.g., smart contract) of the NFT for authorization. Continuously monitors the various instances of access of the user within the first virtual environment and/or the second virtual environment. Compares these instances with the transaction conditions to determine whether the instances of access are within the metes and bounds, i.e., constraints, associated with the transaction conditions. If within the constraints, then authorize the instances of access. If outside the constraints, then deny the instances of access, (7) In addition, the overall behavior of the user is also verified to be within the limits of acceptable deviation using LSTM forecasting models. The various instances of actions are converted into a time series. The LSTM model is deployed on the time series to determine a predicted future action. If the future action is within the limits of acceptable deviation of user behavior, then the user's behavior is considered normal. If not, the user's behavior within the first virtual environment is considered anomalous.

What is more, the present invention provides a technical solution to a technical problem. As described herein, the technical problem includes continuously authenticating the user during various instances of access within a virtual environment and also when the user traverses from one virtual environment to another. The technical solution presented herein leverages NFT technology to verify the identity of the user at all times, where the appearance of the avatar is compared against the various attributes that were registered and stored in the resource layer of the NFT, and analyze each instance of access and traversal against the access privileges stored in the metadata layer (e.g., smart contract) of the NFT for authorization. In particular, the present invention is an improvement in field of authentication in a virtual environment by removing manual input and waste from the implementation of the solution, thus improving speed and efficiency of the process and conserving computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for digital identity detection and verification when traversing between virtual environments 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s)

140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, augmented reality (AR) device, virtual reality (VR) device, extended reality (XR) device, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

An NFT is a cryptographic record (referred to as "tokens") linked to a resource. An NFT is typically stored on a distributed ledger that certifies ownership and authenticity of the resource, and exchangeable in a peer-to-peer network.

FIG. 2A illustrates an exemplary process of creating an NFT 200, in accordance with an embodiment of the invention. As shown in FIG. 2A, to create or "mint" an NFT, a user (e.g., NFT owner) may identify, using a user input device 140, resources 202 that the user wishes to mint as an NFT. Typically, NFTs are minted from resources (often digital objects) that represent both tangible and intangible objects that represent a digital identity of the user within a virtual environment. These resources 202 may include information associated with the user, i.e., information provided by a user in connection with the user's request to access virtual environments within a digital environment (e.g., metaverse), information associated with a digital identity of the user, access management protocols that indicate permissioned access to specific virtual environments, and/or the like. In some embodiments, the digital identity of the user may be an avatar—a digital representative of the user in the virtual environments. In the context of a digital environment, an avatar may include specific attributes that describe its look and feel. In some embodiments, these attributes may include rotational angles of avatar-elasticity of mesh, scale of the avatar in virtual reality spatial space, dimensions of avatar, mass of avatar, friction property of avatar, pixel density of avatar, color of avatar, shading of avatar, texture of avatar, lighting of avatar, avatar behavior—animation sequence, event script functions, input device impact on the avatar (e.g., change in above properties of avatar), and/or the like. These resources 202 are then digitized into a proper format to produce an NFT 204. This NFT 204 may be used by the user to identify themselves when accessing specific virtual environments and traversing between multiple virtual environments. The NFT 204 may be a multi-layered documentation that identifies the resources 202 but also evidences various transaction conditions associated therewith. These transaction conditions may define the metes and bounds of the use of the NFT across various virtual environments. For example, the transaction conditions may define the specific virtual environments that the user may access, the access privileges for the user in each of those virtual environments, transition parameters from one virtual environment to another, and/or the like.

To record the NFT in a distributed ledger, a transaction object 206 for the NFT 204 is created. The transaction object 206 may include a transaction header 206A and a transaction object data 206B. The transaction header 206A may include a cryptographic hash of the previous transaction object, a nonce—a randomly generated 32-bit whole number when the transaction object is created, cryptographic hash of the current transaction object wedded to the nonce, and a time stamp. The transaction object data 206B may include the NFT 204 being recorded. Once the transaction object 206 is generated, the NFT 204 is considered signed and forever tied to its nonce and hash. The transaction object 206 is then deployed in the distributed ledger 208. At this time, a distributed ledger address is generated for the transaction object 206, i.e., an indication of where it is located on the distributed ledger 208 and captured for recording purposes. Once deployed, the NFT 204 is linked permanently to its hash and the distributed ledger 208, and is considered recorded in the distributed ledger 208, thus concluding the minting process As shown in FIG. 2A, the distributed ledger 208 may be maintained on multiple devices (nodes) 210 that are authorized to keep track of the distributed ledger 208. For example, these nodes 210 may be computing devices such as system 130 and end-point device(s) 140. One node 210 may have a complete or partial copy of the entire distributed ledger 208 or set of transactions and/or transaction objects on the distributed ledger 208. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

FIG. 2B illustrates an exemplary NFT 204 as a multi-layered documentation of a resource, in accordance with an embodiment of an invention. As shown in FIG. 2B, the NFT may include at least relationship layer 252, a token layer 254, a metadata layer 256, and a licensing layer 258. The relationship layer 252 may include ownership information 252A, including a map of various users that are associated with the resource and/or the NFT 204, and their relationship to one another. For example, if the NFT 204 is purchased by buyer B1 from a seller S1, the relationship between B1 and S1 as a buyer-seller is recorded in the relationship layer 252. In another example, if the NFT 204 is owned by O1 and the resource itself is stored in a storage facility by storage provider SP1, then the relationship between O1 and SP1 as owner-file storage provider is recorded in the relationship layer 252. The token layer 254 may include a token identification number 254A that is used to identify the NFT 204. The metadata layer 256 may include at least a file location 256A and a resource descriptor 256B. The file location 256A may provide information associated with the specific location of the resource 202. Depending on the conditions listed in the smart contract underlying the distributed ledger 208, the resource 202 may be stored on-chain, i.e., directly on the distributed ledger 208 along with the NFT 204, or off-chain, i.e., in an external storage location. The file location 256A identifies where the resource 202 is stored. The resource descriptor 256B may include specific information associated with the resource itself 202. The resource descriptor 256B may also include the transaction conditions associated with the NFT 204. The licensing layer 258 may include any transferability parameters 258B associated with the NFT 204, such as restrictions and licensing rules associated with purchase, sale, and any other types of transfer of the resource 202 and/or the NFT 204 from one person to another. Those skilled in the art will appreciate that various additional layers and combinations of layers can be configured as needed without departing from the scope and spirit of the invention.

FIG. 3 illustrates a process flow for digital identity detection and verification when traversing between virtual environments 300, in accordance with an embodiment of the invention. As shown in block 302, the process flow includes receiving, from a user input device, a request from a user to traverse from a first virtual environment to a second virtual environment using an NFT identifier. In some embodiments, the NFT identifier may be a numeric or alphanumeric string that is associated with the user, identifying an NFT stored in a distributed ledger. The NFT may represent the digital identity of the user. The user may provide the NFT identifier to indicate that they are previously registered with the entity to access the first virtual environment.

To register the user, the system may be configured to receive, from the user input device, an access registration request from the user. In response, the system may be configured to prompt the user, via the user input device, to provide at least the information associated with the user and information associated with a digital identity of the user. In some embodiments, the digital identity of the user may include an avatar. As described herein, the avatar may be a digital representative of the user in the virtual environments. In response to the prompt, the system may be configured to receive, from the user input device, the information associated with the user and the information associated with a digital identity of the user. Based on the information associated with the user and the information associated with a digital identity of the user, the system may be configured to authorize the access registration request.

As part of the authorization, the system may be configured to generate the NFT, and record the information associated with the user and the information associated with the digital identity of the user. In some embodiments, the system may be configured to determine an authorization level of the user based on the information associated with the user. In response, the system may be configured to generate transaction conditions associated with traversing from the first virtual environment to the second virtual environment for the user based on at least the authorization level associated with the user. These transaction conditions may specify access privileges (rights and abilities) of the user when traversing from one virtual environment to another in the same access session. In some embodiments, these transaction conditions may also specify the access privileges of the user when interacting with digital objects within a particular virtual environment, i.e., the first virtual environment and/or the second virtual environment. These transaction conditions are then recorded in a smart contract associated with the NFT, and subsequently stored in one of the many metadata layers of the NFT. The NFT is then recorded on the distributed ledger and linked to the user identity. As part of this recordation, the system may be configured to issue the user an NFT identifier that uniquely identifies the user. The user may then use this NFT identifier to request access to specific virtual environments.

Next, as shown in block 304, the process flow includes retrieving, using an NFT navigation engine, an NFT from a distributed ledger based on at least the NFT identifier. As described herein, the NFT may be recorded in the distributed ledger. In some embodiments, as part of the recordation, the system may be configured to generate an NFT identifier that may include a distributed ledger address embedded therein. When the NFT identifier is received, in some embodiments, the system may be configured to parse the alphanumeric string to extract the distributed ledger address indicating the location of the NFT on the distributed ledger.

Next, as shown in block 306, the process flow includes extracting, from a metadata layer of the NFT, information associated with the user and transaction conditions associated with traversing from the first virtual environment to the second virtual environment. As described herein, the transaction conditions may specify access privileges (rights and abilities) of the user when traversing from one virtual environment to another in the same access session and the access privileges of the user when interacting with digital objects within a particular virtual environment.

Next, as shown in block 308, the process flow includes authorizing, using an access management engine, the user to traverse from the first virtual environment to the second virtual environment based on at least the information associated with the user and the transaction conditions. In some embodiments, to authorize the user, the system may be configured to validate, using the access management engine, the information associated with the user determine whether the user is indeed who they say they are. In this regard, the system may be configured to execute a multi-factor authentication (MFA) for identity verification. In addition, the system may be configured to determine, using the access management engine, whether the transaction conditions meet specific requirements to traverse from the first virtual environment to the second virtual environment. In addition, the system may be configured to determine, using the access management engine, whether the transaction conditions meet the specific requirements for the user to access the virtual environment that the user is traversing to, i.e., the second virtual environment. In response to successfully validating the information associated with the user and determining that the transaction conditions meet the requirements, the system may be configured to authorize the user to traverse from the first virtual environment to the second virtual environment, and allow the user to access the second virtual environment.

As described herein, during user access to a virtual environment, the NFT that has an outward appearance as avatar, may be continuously monitored to verify the identity of the user at all times. When the user traverses from one virtual environment to another, the digital identity of the user may be monitored in both the virtual environment the user is traversing from, i.e., first virtual environment, and the virtual environment that the user is traversing to, i.e., second virtual environment. Ideally, when the user has traversed from one virtual environment to another, at any particular time instant, the user's presence is no longer detected in the virtual environment the user traversed from, i.e., first virtual environment, and is only detected in the virtual environment that the user traversed to, i.e., second virtual environment. If the user's digital identity is detected simultaneously in both the first virtual environment and the second virtual environment, it may be a cause for potential exposure. In such situations, the system may be configured to extract the appearance of the avatar, more specifically, the perceivable attributes of the digital identity of the user in both the first virtual environment and the second virtual environment during the simultaneous instances of access. These attributes of each digital identity are compared with the information associated with the digital identity of the user recorded in the NFT. In response, the system may be configured to determine that the attributes of at least one digital identity do not match the information associated with the digital identity of the user recorded in the NFT, raising questions regarding the authenticity of that digital identity of the user. In other words, either the digital identity of the user in the first virtual environment and/or the digital identity of the user in the second virtual environment may not be authentic. In response, the system may be configured to transmit control signals configured to cause an administrator input device to display a notification indicating that at least one digital identity of the user during the simultaneous instances of access does not match the information associated with the digital identity of the user recorded in the NFT.

In addition to monitoring the appearance of the digital identity of the user, the system may be configured to use the various instances of actions of the user in a virtual environment to determine whether the overall behavior of the user is within the limits of acceptable deviation. In this regard, the system may be configured to employ machine learning techniques to predict a future instance of action of the user based on the various instances of access. If the predicted future instance of action is within the predetermined limits of acceptable deviation, then the user's behavior is deemed behaviorally acceptable. On the other hand, if the predicted future instance of action is outside the predetermined limits of acceptable deviation, then the user's behavior is deemed behaviorally anomalous, and the issue is escalated to the administrator of the first virtual environment. To achieve this, the system may be configured to employ machine learning techniques, such as recurrent neural networks (RNN). RNNs, and more specifically, Long Short-Term Memory (LSTM) based forecasting models to predict future values based on previous, sequential data. Examples of sequential data include text and sentences, audio, motion pictures or videos, time-series data, material composition, and/or the like. Therefore, to develop an LSTM forecasting model, the system may be configured to first convert the instances of actions into a sequential time series. Then, the model is applied to the time series to predict the future action with the highest likelihood of occurrence.

Similarly, each instance of access in a virtual environment is also analyzed against the transaction conditions (e.g., access privileges) stored in the metadata layer (e.g., smart contract) of the NFT for authorization. Accordingly, the system may be configured to continuously monitor the various instances of access (using the NFT) of the user within the first virtual environment and/or the second virtual environment and compare these instances with the transaction conditions to determine whether the instances of access are within the metes and bounds, i.e., constraints, associated with the transaction conditions. If the instances of access are within the constraints of the transaction conditions, then the system may be configured to authorize the instances of access. On the other hand, if the instances of access are outside the constraints of the transaction conditions, then the system may be configured to deny the instances of access.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, a computer-implemented process is thus produced, such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for digital identity detection and verification when traversing between virtual environments, the system comprising:
    a processor;
    a non-transitory storage device containing instructions that, when executed by the processor, cause the processor to:
    receive, from a user input device, a request from a user to traverse from a first virtual environment to a second virtual environment using an NFT identifier-during an access session;
    retrieve, using an NFT navigation engine, an NFT from a distributed ledger based on at least the NFT identifier;
    extract, from a metadata layer of the NFT, information associated with the user and transaction conditions associated with traversing from the first virtual environment to the second virtual environment;
    authorize, using an access management engine, the user to traverse from the first virtual environment to the second virtual environment based on at least the information associated with the user and the transaction conditions;
    determine that the user has traversed from the first virtual environment to the second virtual environment;
    continuously monitor an appearance of the digital identity of the user in the first virtual environment and the second virtual environment, wherein the digital identity of the user comprises an avatar;
    determine simultaneous presence of the avatar of the user in both the first virtual environment and the second virtual environment based on monitoring the appearance of the avatar of the user;
    extract one or more attributes of the avatar, wherein the one or more avatar attributes comprises rotational angles of the avatar, scale of the avatar in a virtual environment spatial space, dimensions of the avatar, mass of the avatar, friction property of the avatar, pixel density of the avatar, color of the avatar, shading of the avatar, texture of the avatar, lighting of the avatar, behavior of the avatar, and input device impact on the avatar;
    compare the extracted attributes of the avatar with information associated with the digital identity of the user as recorded in the NFT to determine a match;
    continuously capture instances of actions of the user in the first virtual environment;
    transform the instances of actions into sequential time series data;
    initiate a long short-term memory (LSTM) model on the sequential time series data to predict a future instance of action of the user;
    determine whether the predicted future instance of action of the user is within a predetermined threshold of acceptable deviation;
    in an instance in which the extracted attributes of the avatar do not match the information associated with the digital identity of the user as recorded in the NFT, and the predicted future instance of action of the user is outside the predetermined threshold of acceptable deviation, transmit control signals configured to cause an administrator input device to display a notification indicating that, (i) at least one of the simultaneous instances of access of the user is unauthorized, (ii) at least one extracted attribute of the avatar does not match the information associated with the digital identity of the user as recorded in the NFT; and (iii) a behavior of the user is anomalous.

2. The system of claim 1, wherein the instructions, when executed, further causes the processor to:
    determine that the request to traverse from the first virtual environment to the second virtual environment comprises a request to access the second virtual environment;
    extract, from the metadata layer of the NFT, transaction conditions associated with user access to the second virtual environment; and
    authorize, using the access management engine, the user to access the second virtual environment based on at least the transaction conditions associated with user access to the second virtual environment.

3. The system of claim 2, wherein the instructions, when executed, further causes the processor to:
    validate, using the access management engine, the information associated with the user to verify user identity;
    determine, using the access management engine, that the transaction conditions meet one or more requirements for access to the second virtual environment, wherein the transaction conditions comprise at least access privileges of the user; and
    authorize, using the access management engine, the user to access the second virtual environment based on at least validating the information associated with the user and that the transaction conditions meet the one or more requirements for access to the second virtual environment.

4. The system of claim 1, wherein the instructions, when executed, further causes the processor to:
    receive, from the user input device, a request from the user to access the first virtual environment, wherein the request comprises at least the NFT identifier;
    extract, from the metadata layer of the NFT, information associated with the user and transaction conditions associated with the access to the first virtual environment; and
    authorize, using the access management engine, the user to access the first virtual environment based on at least the information associated with the user and the transaction conditions associated with the access to the first virtual environment.

5. The system of claim 1, wherein the instructions, when executed, further causes the processor to:
    receive, from the user input device, an access registration request from the user;

prompt the user, via the user input device, to provide at least the information associated with the user, information associated with a digital identity of the user;

receive, from the user input device, the information associated with the user and the information associated with a digital identity of the user; and authorize the access registration request based on at least the information associated with the user and the information associated with the digital identity of the user.

6. The system of claim 1, wherein authorizing the access registration request further comprises:

generating, using an NFT generation engine, the NFT based on at least the information associated with the user and the information associated with the digital identity of the user; and linking the user identity with the NFT.

7. The system of claim 6, wherein the instructions, when executed, further causes the processor to:

determine an authorization level associated with the user based on at least the information associated with the user;

generate transaction conditions associated with traversing from the first virtual environment to the second virtual environment for the user based on at least the authorization level associated with the user;

record the transaction conditions associated with traversing from the first virtual environment to the second virtual environment for the user in a smart contract associated with the NFT; and store the smart contract in the metadata layer of the NFT.

8. The system of claim 1, wherein, in determining that at least one of the simultaneous instances of access of the user is unauthorized, the instructions, when executed, further causes the processor to:

extract one or more attributes of the digital identity of the user during the simultaneous instances of access;

compare the one or more attributes of the digital identity of the user during the simultaneous instances of access with the information associated with the digital identity of the user recorded in the NFT;

determine that the one or more attributes of the digital identity of the user during the simultaneous instances of access does not match the information associated with the digital identity of the user recorded in the NFT; and determine that at least one of the simultaneous instances of access of the user is unauthorized based on at least determining that that the one or more attributes of the digital identity of the user during the simultaneous instances of access does not match the information associated with the digital identity of the user recorded in the NFT.

9. A computer program product for digital identity detection and verification when traversing between virtual environments, the computer program product comprising a non-transitory computer-readable medium comprising code causing an apparatus to:

receive, from a user input device, a request from a user to traverse from a first virtual environment to a second virtual environment using an NFT identifier;

retrieve, using an NFT navigation engine, an NFT from a distributed ledger based on at least the NFT identifier;

extract, from a metadata layer of the NFT, information associated with the user and transaction conditions associated with traversing from the first virtual environment to the second virtual environment;

authorize, using an access management engine, the user to traverse from the first virtual environment to the second virtual environment based on at least the information associated with the user and the transaction conditions;

determine that the user has traversed from the first virtual environment to the second virtual environment;

continuously monitor an appearance of the digital identity of the user in the first virtual environment and the second virtual environment, wherein the digital identity of the user comprises an avatar;

determine simultaneous presence of the avatar of the user in both the first virtual environment and the second virtual environment based on monitoring the appearance of the avatar of the user;

extract one or more attributes of the avatar, wherein the one or more avatar attributes comprises rotational angles of the avatar, scale of the avatar in a virtual environment spatial space, dimensions of the avatar, mass of the avatar, friction property of the avatar, pixel density of the avatar, color of the avatar, shading of the avatar, texture of the avatar, lighting of the avatar, behavior of the avatar, and input device impact on the avatar;

compare the extracted attributes of the avatar with information associated with the digital identity of the user as recorded in the NFT to determine a match;

continuously capture instances of actions of the user in the first virtual environment;

transform the instances of actions into sequential time series data;

initiate a long short-term memory (LSTM) model on the sequential time series data to predict a future instance of action of the user;

determine whether the predicted future instance of action of the user is within a predetermined threshold of acceptable deviation;

in an instance in which the extracted attributes of the avatar do not match the information associated with the digital identity of the user as recorded in the NFT, and the predicted future instance of action of the user is outside the predetermined threshold of acceptable deviation, transmit control signals configured to cause an administrator input device to display a notification indicating that, (i) at least one of the simultaneous instances of access of the user is unauthorized, (ii) at least one extracted attribute of the avatar does not match the information associated with the digital identity of the user as recorded in the NFT; and (iii) a behavior of the user is anomalous.

10. The computer program product of claim 9, wherein the code further causes the apparatus to:

determine that the request to traverse from the first virtual environment to the second virtual environment comprises a request to access the second virtual environment;

extract, from the metadata layer of the NFT, transaction conditions associated with user access to the second virtual environment; and authorize, using the access management engine, the user to access the second virtual environment based on at least the transaction conditions associated with user access to the second virtual environment.

11. The computer program product of claim 10, wherein the code further causes the apparatus to:

validate, using the access management engine, the information associated with the user to verify user identity;

determine, using the access management engine, that the transaction conditions meet one or more requirements for access to the second virtual environment, wherein the transaction conditions comprise at least access privileges of the user; and authorize, using the access management engine, the user to access the second virtual environment based on at least validating the information associated with the user and that the transaction conditions meet the one or more requirements for access to the second virtual environment.

12. The computer program product of claim 9, wherein the code further causes the apparatus to:

receive, from the user input device, a request from the user to access the first virtual environment, wherein the request comprises at least the NFT identifier;

extract, from the metadata layer of the NFT, information associated with the user and transaction conditions associated with the access to the first virtual environment; and authorize, using the access management engine, the user to access the first virtual environment based on at least the information associated with the user and the transaction conditions associated with the access to the first virtual environment.

13. The computer program product of claim 12, wherein the code further causes the apparatus to:

receive, from the user input device, an access registration request from the user;

prompt the user, via the user input device, to provide at least the information associated with the user, information associated with a digital identity of the user;

receive, from the user input device, the information associated with the user and the information associated with a digital identity of the user; and authorize the access registration request based on at least the information associated with the user and the information associated with the digital identity of the user.

14. The computer program product of claim 9, wherein authorizing the access registration request further comprises:

generating, using an NFT generation engine, the NFT based on at least the information associated with the user and the information associated with the digital identity of the user; and linking the user identity with the NFT.

15. A method for digital identity detection and verification when traversing between virtual environments, the method comprising:

receiving, from a user input device, a request from a user to traverse from a first virtual environment to a second virtual environment using an NFT identifier;

retrieving, using an NFT navigation engine, an NFT from a distributed ledger based on at least the NFT identifier;

extracting, from a metadata layer of the NFT, information associated with the user and transaction conditions associated with traversing from the first virtual environment to the second virtual environment;

authorizing, using an access management engine, the user to traverse from the first virtual environment to the second virtual environment based on at least the information associated with the user and the transaction conditions;

determining that the user has traversed from the first virtual environment to the second virtual environment;

continuously monitoring an appearance of the digital identity of the user in the first virtual environment and the second virtual environment, wherein the digital identity of the user comprises an avatar;

determining simultaneous presence of the avatar of the user in both the first virtual environment and the second virtual environment based on monitoring the appearance of the avatar of the user;

extracting one or more attributes of the avatar, wherein the one or more avatar attributes comprises rotational angles of the avatar, scale of the avatar in a virtual environment spatial space, dimensions of the avatar, mass of the avatar, friction property of the avatar, pixel density of the avatar, color of the avatar, shading of the avatar, texture of the avatar, lighting of the avatar, behavior of the avatar, and input device impact on the avatar;

comparing the extracted attributes of the avatar with information associated with the digital identity of the user as recorded in the NFT to determine a match;

continuously capturing instances of actions of the user in the first virtual environment;

transforming the instances of actions into sequential time series data;

initiating a long short-term memory (LSTM) model on the sequential time series data to predict a future instance of action of the user;

determining whether the predicted future instance of action of the user is within a predetermined threshold of acceptable deviation;

in an instance in which the extracted attributes of the avatar do not match the information associated with the digital identity of the user as recorded in the NFT, and the predicted future instance of action of the user is outside the predetermined threshold of acceptable deviation, transmitting control signals configured to cause an administrator input device to display a notification indicating that, (i) at least one of the simultaneous instances of access of the user is unauthorized, (ii) at least one extracted attribute of the avatar does not match the information associated with the digital identity of the user as recorded in the NFT; and (iii) a behavior of the user is anomalous.

* * * * *